B. Q. JORDAN.
WHEEL CONTROLLING DEVICE FOR VEHICLES.
APPLICATION FILED JUNE 20, 1916.
1,204,991.
Patented Nov. 14, 1916.
2 SHEETS—SHEET 1.
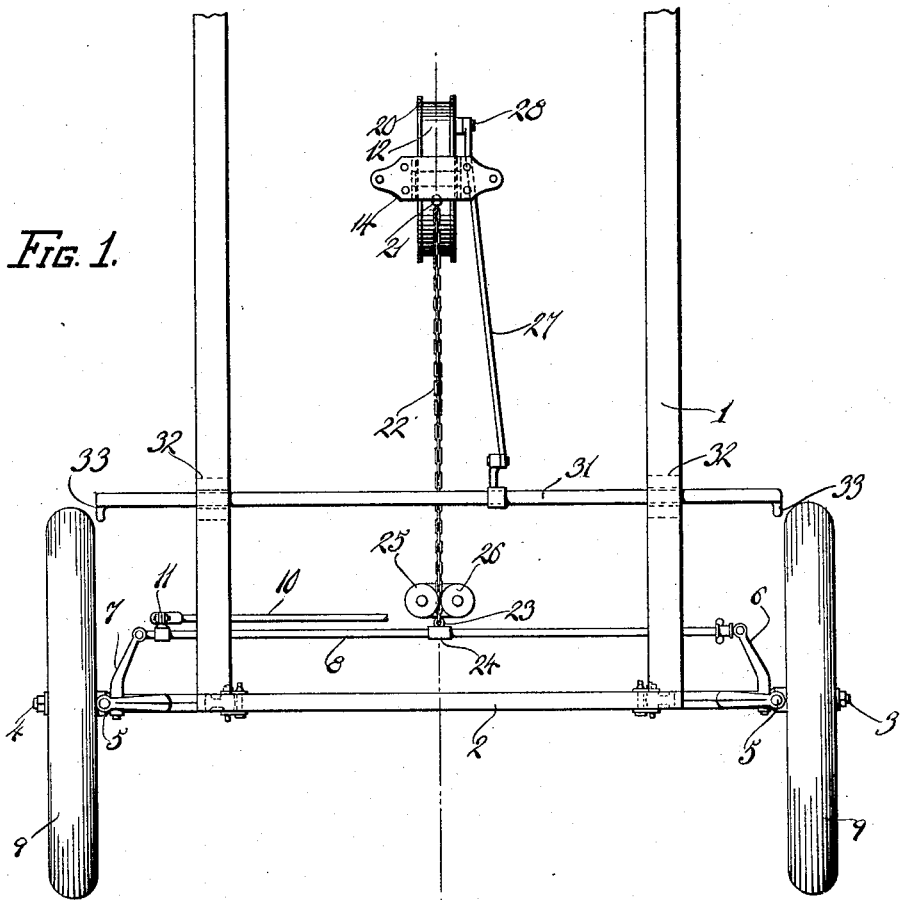
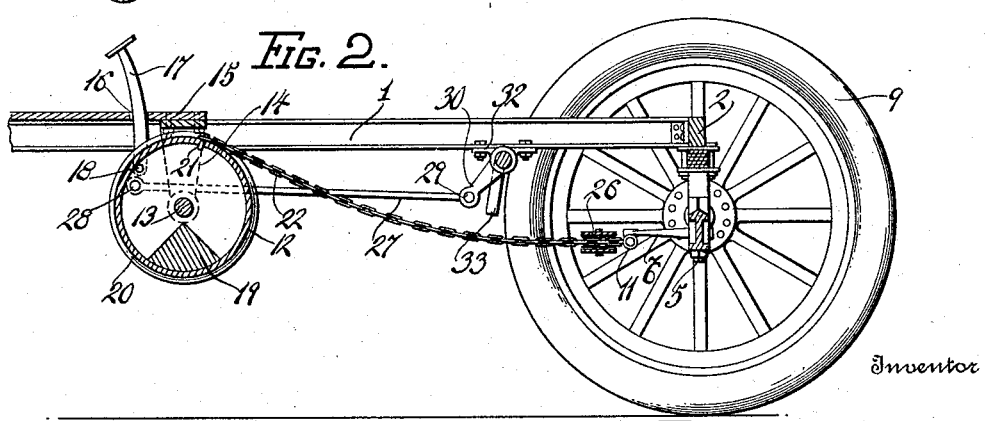
Witness
T. P. Harwood
C. R. Ziegler
Inventor
BESSIE Q. JORDAN.
By Joshua R. H. Potts.
Her Attorney

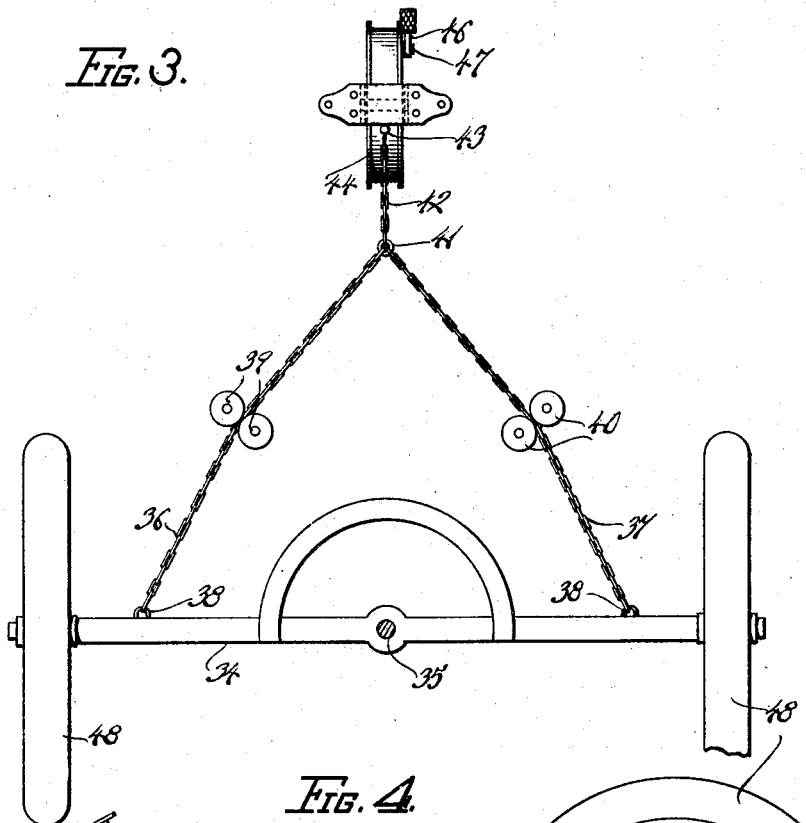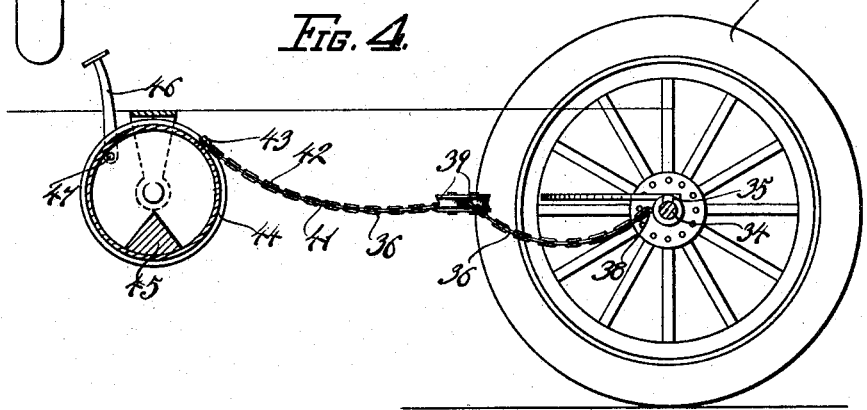

UNITED STATES PATENT OFFICE.

BESSIE Q. JORDAN, OF CAMDEN, NEW JERSEY.

WHEEL-CONTROLLING DEVICE FOR VEHICLES.

1,204,991.  Specification of Letters Patent.  Patented Nov. 14, 1916.

Application filed June 20, 1916. Serial No. 104,811.

*To all whom it may concern:*

Be it known that I, BESSIE Q. JORDAN, a citizen of the United States, residing at Camden, in the county of Camden and State of New Jersey, have invented certain new and useful Improvements in Wheel-Controlling Devices for Vehicles, of which the following is a specification.

My invention consists of improvements in wheel-controlling devices for vehicles.

One object of my invention is to provide apparatus for use on vehicles which will be operative to move and hold the wheels in straight alinement with the body of the vehicle.

Another object of my invention is to so construct the elements thereof that they will not interfere during the ordinary running of the vehicle with the turning of the wheels, as for example, by the ordinary steering wheel of an automobile.

A further object of my invention is to so carry out the principle thereof that it may be applied to vehicles in which an entire axle is pivoted at a common point or in which two movable parts of the axle are pivoted to a main axle and in which case the main axle is stationary.

A still further object of my invention is to so construct the elements of my invention that they may be quickly and easily operated and assembled and can be manufactured at a reasonably low cost.

These objects, and other advantageous ends which will be described hereinafter, I attain in the following manner, reference being had to the accompanying drawings in which—

Figure 1 is a fragmentary plan view showing sufficient of an automobile frame having my invention thereon. Fig. 2 is a side elevation of Fig. 1. Fig. 3 is a fragmentary plan view showing a modified form of my invention, and Fig. 4 is a side elevation of Fig. 3.

Referring to Figs. 1 and 2, of my invention, 1 represents the frame having a stationary axle 2 and two movable axles 3 and 4 which are pivoted at 5 to the main axle 2. These movable axles 3 and 4 may be of any of the well known constructions, and as illustrated have secured thereto arms 6 and 7 respectively which in turn are pivoted to opposite ends of a longitudinally extending rod 8, this rod 8 being substantially parallel with the stationary axle 2, so that a movement longitudinally of said rod 8 in one direction, will cause the wheels 9 which are rotatable on the axles 3 and 4, to be turned in one direction, while a movement of the rod 8 in an opposite direction, will cause a corresponding opposite movement of said wheels 9.

The rod 8 may be ordinarily moved by means of a steering wheel or other means (not shown), a connecting rod 10 which is connected to the rod 8 being pivotally secured at 11 to said rod 8. This connecting rod 10 is the element which is moved by the steering or said other means, so that under ordinary operation and running of the car, the connecting rod 10 receives alternate pulling and pushing movements to actuate said rod 8, and thereby control the movement of the car.

In actual practice, it is extremely difficult to hold the wheels 9 in an exact straight alinement with the body or frame of the vehicle, especially when the roads are slippery as in wet weather or when it is necessary to confine the wheels to a car track or other narrow path.

In order to insure the movement of the wheels 9 into straight alinement with the body or frame of the vehicle, and to hold them in said straight alinement, I provide the following apparatus.

A rotatable drum 12 has a shaft 13 secured thereto which is rotatably supported in arms or hangers 14 which depend from the bottom 15 of the vehicle. This bottom 15 has a hole 16 through which passes a foot lever 17, the latter being pivotally connected at 18 to one face of the drum 12.

A balance weight 19 is positioned within the drum, so that under normal conditions, the drum is held in the position shown in Fig. 2, holding the foot lever 17 in its raised position.

The drum 12 is provided with peripheral flanges 20, and at a point within said flanges is secured a bolt 21, the latter having secured to it one end of a chain 22, the other end of said chain being secured to an eyelet 23 in a sleeve 24, the latter being secured to the rod 8 at a position midway between its ends. The drum 12 is also located centrally within the frame 1, and the chain 22 passes between two guide rolls 25 and 26, the axes of these guide rollers being located at equal distances from the longitudinal center line of the frame 1 or body of the car, so that said chain when stretched between the bolt 21 and the rollers 25 and 26, will extend directly through said longitudinal center line of the car.

The length of the chain 22 is such that said chain is slack when the foot lever is in the position shown in Fig. 2, and the rod 8 may be moved longitudinally in either direction through the medium of the connecting rod 10 and the steering means. However, when the downward pressure is applied to the foot lever 17, the drum 12 is rotated and by partially wrapping the chain 22 thereon, causes the latter to be stretched taut and to move the rod 8 into such position that its sleeve 24 is in alinement with the center line of the car, thereby moving the axles 3 and 4 to bring the wheels 9 into straight alinement.

By having the two guide rolls 25 and 26, the sleeve 24 will be moved to said central position from its position at either side of said center line, so that the movement of the foot lever will always insure the movement of the rod 8 into such position that its sleeve 24 is central.

In order to provide an auxiliary means for preventing the accidental movement of the wheels 9 after they have been moved into straight alinement by means of the foot lever 17, I provide a connecting link 27 which has one end pivotally secured at 28 to the drum 12, and its other end pivoted at 29 to a crank arm 30. This crank arm 30 is secured to a rocker shaft 31 which is suspended from the frame 1 by means of brackets 32. Each end of the rocker shaft 31 is provided with an arm 33 designed to be moved between wheels 9, after they have been moved to said straight position.

It will thus be noticed that the pivot 28 of the connecting link 27 is so positioned on the drum that it will not receive any forward movement until after the drum has been partially rotated and the chain has started to move the wheels into their straight positions, but that after the wheels have been moved sufficiently into their straight position to permit the arms 33 to be extended between them, the final tightening movement for the chain will also effect the movement of said arms 33 between said wheels.

The balance weight 19 acts after the foot lever is released, to return the drum to the position shown in Fig. 2, and to move the arms 33 and chain 27 into their inoperative positions.

In the form of my invention shown in Figs. 3 and 4, the entire axle 34 is pivoted at 35, and two chains 36 and 37 each have one of their ends connected at 38 to the axle at positions opposite the pivot point 35. The chains 36 and 37 unite, after respectively passing between two pairs of guide rollers 39 and 40, as shown at 41, this uniting point being in alinement with the longitudinal center line of the vehicle, and a single chain 42 connects at this point and is secured at 43 to a winding drum 44 which is of similar construction to the drum 12 and includes a balance weight 45. This drum has a foot lever 46 which is pivoted thereto at 47. In this form of my invention, the chains 36 and 37 are normally slack to permit the free turning of the axle 34 on its pivot 35 during the ordinary running of the vehicle. However, since one of the chains 36 or 37 is stretched during the turning movement of the axle 34, if it is desired to move the axle into such position that its wheels 48 will be moved into straight alinement with the body of the car, a downward movement of the foot lever 46 will cause the stretched chain 36 or 37 to be pulled a pre-determined distance, and then both chains to be stretched tight and thereby hold the axle 34 against further pivotal movement.

It will be noted that the rollers 25, 26, 39 and 40 may be carried by any suitable means (not illustrated) which is connected to the frame.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. The combination in a vehicle, of a pair of wheels, movable means supporting the wheels, flexible means attached to the wheel-supporting means and normally slack so as to permit the free movement thereof, and means for pulling said flexible means taut to move said wheel-supporting means into such position as to bring said wheels into straight alinement with the body of the vehicle, substantially as described.

2. The combination in a vehicle, of a pair of wheels, movable means supporting the wheels, flexible means attached to the wheel-supporting means and normally slack so as to permit the free movement thereof, a drum having said flexible means connected thereto, and means for rotating said drum to pull said flexible means taut and thereby move said wheel-supporting means into such position as to bring said wheels into straight alinement with the body of the vehicle, substantially as described.

3. The combination in a vehicle, of a pair of wheels, movable means supporting the wheels, flexible means attached to the wheel-supporting means and normally permitting the free movement thereof, a drum having said flexible means connected thereto, means for rotating said drum to pull said flexible means taut and thereby move said wheel-supporting means into such position as to bring said wheels into straight alinement with the body of the vehicle, and automatically operative means for returning said flexible means to its inoperative position, substantially as described.

4. The combination in a vehicle, of a pair of wheels, movable means supporting the wheels, flexible means attached to the wheel-supporting means and normally permitting the free movement thereof, a drum having said flexible means connected thereto, means for rotating said drum to pull said flexible means taut and thereby move said wheel-supporting means into such position as to bring said wheels into straight alinement with the body of the vehicle, and arms operative in conjunction with said drum movable adjacent said wheels, said arms being operative as auxiliary means to prevent turning of said wheels from a straight path, substantially as described.

5. The combination in a vehicle, of a pair of wheels, movable means supporting the wheels, flexible means attached to the wheel-supporting means and normally permitting the free movement thereof, a drum having said flexible means connected thereto, means for rotating said drum to pull said flexible means taut and thereby move said wheel-supporting means into such position as to bring said wheels into straight alinement with the body of the vehicle, a rocker shaft, a crank arm on said rocker shaft, a link connecting said drum with said crank arm, and arms on said rocker shaft, said arms being operative as auxiliary means to prevent turning of said wheels from a straight path, substantially as described.

6. The combination in a vehicle, of a pair of wheels, movable means supporting the wheels, flexible means attached to the wheel-supporting means and normally permitting the free movement thereof, a drum having said flexible means connected thereto, a foot lever for rotating said drum to pull said flexible means taut and thereby move said wheel-supporting means into such position as to bring said wheels into straight alinement with the body of the vehicle, a rocker shaft, a crank arm on said rocker shaft, a link connecting said drum with said crank arm, and arms on said rocker shaft, said arms being operative as auxiliary means to prevent turning of said wheels from a straight path, substantially as described.

7. The combination in a vehicle, of a frame including a stationary axle, two movable wheel supporting axles on said main axle, a rod movably connecting said wheel-supporting axles, a winding drum, guiding means, a flexible member connecting said winding drum with said rod and confined by said guiding means, and means for rotating said drum to pull said flexible means taut and thereby move said rod into a pre-determined position, substantially as described.

8. The combination in a vehicle, of a frame including a stationary axle, two movable wheel-supporting axles on said main axle, a rod movably connecting said wheel-supporting axles, a winding drum, a pair of guide rollers having their axes located at equal distances from the longitudinal center line of the vehicle, a flexible member secured to said drum and to said rod, said flexible member passing centrally between said guide rollers, and means for rotating said drum to pull said flexible means taut, substantially as described.

9. The combination in a vehicle, of a frame including a stationary axle, two movable wheel-supporting axles on said main axle, a rod movably connecting said wheel-supporting axles, a winding drum, a pair of guide rollers having their axes located at equal distances from the longitudinal center line of the vehicle, a flexible member secured to said drum and to said rod, said flexible member passing centrally between said guide rollers, means for rotating said drum to pull said flexible means taut, and arms movable adjacent said wheels, said arms being operative in conjunction with said drum and serving as auxiliary means to prevent turning of said wheels from a straight path, substantially as described.

10. The combination in a vehicle, of a frame including a stationary axle, two movable wheel-supporting axles on said main axle, a rod movably connecting said wheel-supporting axles, a winding drum, a pair of guide rollers having their axes located at equal distances from the longitudinal center line of the vehicle, a flexible member secured to said drum and to said rod, said flexible member passing centrally between said guide rollers, means for rotating said drum to pull said flexible means taut, and arms operatively connected to said drum to a position adjacent said wheels, said arms being operative as auxiliary means to prevent turning of said wheels from a straight path, substantially as described.

11. The combination in a vehicle, of a frame including a stationary axle, two movable wheel-supporting axles on said main axle, a rod movably connecting said wheel-supporting axles, a winding drum, a pair of guide rollers having their axes located at equal distances from the longitudinal center line of the vehicle, a flexible member secured to said drum and to said rod, said flexible member passing centrally between said guide rollers, a rocker shaft, a crank arm on said rocker shaft, a link connecting said drum with said crank arm, a foot lever for rotating said drum, and arms on said shaft, said arms being operative as auxiliary means to prevent turning of said wheels from a straight path, substantially as described.

In testimony whereof I have signed my name to this specification in the presence of two subscribing witnesses.

BESSIE Q. JORDAN.

Witnesses:
MONROE JORDAN,
ELLEN H. JORDAN.